United States Patent
Mizoguchi et al.

(10) Patent No.: US 10,703,643 B2
(45) Date of Patent: Jul. 7, 2020

(54) ε-IRON OXIDE TYPE FERROMAGNETIC POWDER

(71) Applicant: FUJIFILM Corporation, Tokyo (JP)

(72) Inventors: Takao Mizoguchi, Minami-ashigara (JP); Takashi Fujimoto, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 378 days.

(21) Appl. No.: 15/857,861

(22) Filed: Dec. 29, 2017

(65) Prior Publication Data

US 2018/0186654 A1    Jul. 5, 2018

(30) Foreign Application Priority Data

Jan. 5, 2017 (JP) ................................. 2017-000705
Nov. 24, 2017 (JP) ................................. 2017-225465

(51) Int. Cl.
  *C01G 49/00*    (2006.01)
  *G11B 5/706*    (2006.01)
  *H01F 1/11*    (2006.01)
  *C01G 49/06*    (2006.01)

(52) U.S. Cl.
  CPC .......... *C01G 49/009* (2013.01); *C01G 49/06* (2013.01); *G11B 5/70642* (2013.01); *H01F 1/11* (2013.01); *C01P 2002/52* (2013.01); *C01P 2006/42* (2013.01)

(58) Field of Classification Search
  CPC ...... C01G 49/009; H01F 1/11; C01P 2002/52; C01P 2006/42
  See application file for complete search history.

(56) References Cited

FOREIGN PATENT DOCUMENTS

JP    5445843 B2    3/2014

*Primary Examiner* — C Melissa Koslow
(74) *Attorney, Agent, or Firm* — Sughrue Mion, PLLC

(57) ABSTRACT

The ε-iron oxide type ferromagnetic powder contains Fe, a metal element selected from the group consisting of monovalent metal elements and divalent metal elements at a content rate within a range of 0.2 to 16.5 at % with respect to 100.0 at % of Fe, and a pentavalent metal element at a content rate within a range of 0.2 to 7.5 at % with respect to 100.0 at % of Fe, in which a total content rate of metal elements other than Fe is within a range of 2.5 to 24.0 at % with respect to 100.0 at % of Fe.

17 Claims, 2 Drawing Sheets

ε-IRON OXIDE TYPE FERROMAGNETIC POWDER

CROSS-REFERENCE TO RELATED APPLICATIONS

This application claims priority under 35 U.S.C 119 to Japanese Patent Application No. 2017-000705 filed on Jan. 5, 2017 and Japanese Patent Application No. 2017-225465 filed on Nov. 24, 2017. Each of the above applications is hereby expressly incorporated by reference, in its entirety.

BACKGROUND OF THE INVENTION

1. Field of the Invention

The present invention relates to an ε-iron oxide type ferromagnetic powder.

2. Description of the Related Art

Ferromagnetic powders are widely used in various fields. In recent years, among the ferromagnetic powders, an ε-iron oxide type ferromagnetic powder has drawn attention (for example, see JP5445843B).

SUMMARY OF THE INVENTION

Generally, the ε-iron oxide type ferromagnetic powder is said to be a ferromagnetic powder having high coercive force. However, the high coercive force tends to make it difficult for the ε-iron oxide type ferromagnetic powder to be applied in various uses. For example, in the use such as magnetic recording, the higher the coercive force of the ferromagnetic powder contained in a magnetic recording medium, the more difficult it is to write information on the magnetic recording medium (for example, see paragraph "0006" in JP5445843B).

Therefore, in recent years, the method for reducing the coercive force of the ε-iron oxide type ferromagnetic powder has been studied. However, in a case where the coercive force of the ferromagnetic powder is reduced, the stability of magnetization against heat (hereinafter, referred to as "heat resistance" as well) tends to deteriorate. For example, after being stored or used in a normal environment such as an environment with room temperature, the ferromagnetic powder having poor heat resistance experiences a partial loss in magnetization, which makes it difficult for the ferromagnetic powder to fully perform its function in some cases.

Regarding the aforementioned point, in JP5445843B, for an ε-iron oxide type ferromagnetic powder, a study is conducted on a method for accomplishing both the arbitrary adjustability of coercive force and the heat resistance (see paragraph "0009" in JP5445843B). However, the inventors of the present invention considered that in a case where the heat resistance of the ε-iron oxide type ferromagnetic powder can be improved further than in a case where the heat resistance is improved by the method described in JP5445843B, the ε-iron oxide type ferromagnetic powder can become more useful.

Accordingly, an object of one aspect of the present invention is to provide an ε-iron oxide type ferromagnetic powder which has coercive force suitable for being applied in various uses and has excellent heat resistance.

An aspect of the present invention relates to an ε-iron oxide type ferromagnetic powder comprising Fe, a metal element (hereinafter, referred to as "A element") selected from the group consisting of monovalent metal elements and divalent metal elements at a content rate within a range of 0.2 to 16.5 at % with respect to 100.0 at % of Fe, and a pentavalent metal element (hereinafter, referred to as "B element") at a content rate within a range of 0.2 to 7.5 at % with respect to 100.0 at % of Fe, in which a total content rate of metal elements other than Fe is within a range of 2.5 to 24.0 at % with respect to 100.0 at % of Fe.

The ferromagnetic powder is an ε-iron oxide type ferromagnetic powder. In the present invention and the present specification, "ε-iron oxide type ferromagnetic powder" refers to a ferromagnetic powder from which an ε-iron oxide type crystal structure is detected as a main phase by X-ray diffractometry. The main phase refers to a structure to which a diffraction peak of the highest intensity is attributed in an X-ray diffraction spectrum obtained by X-ray diffractometry. For example, in a case where a diffraction peak of the highest intensity is attributed to an ε-iron oxide type crystal structure in an X-ray diffraction spectrum obtained by X-ray diffractometry, it is decided that the ε-iron oxide type crystal structure is detected as a main phase. In a case where only a single structure is detected by X-ray diffractometry, the detected structure is regarded as a main phase.

Regarding "ε-iron oxide type ferromagnetic material" which will be described later, except that the form of the ferromagnetic material is not limited to a powder, the above description relating to an ε-iron oxide type ferromagnetic powder is applied.

Furthermore, in the present invention and the present specification, a powder means an aggregate of a plurality of particles. For example, the ε-iron oxide type ferromagnetic powder means an aggregate of a plurality of ε-iron oxide type ferromagnetic particles. The aggregate is not limited to an aspect in which the particles composing the aggregate directly contact each other, and includes an aspect in which a binder and the like which will be described later are interposed between the particles, for example.

In addition, in the present invention and the present specification, metal elements also include semimetal elements. Examples of the monovalent metal elements include Li, Na, and the like. Examples of the divalent metal elements include Be, Mg, Ca, Mn, Co, Ni, Cu, Zn, Pd, Ag, Cd, Hg, Pb, and the like. Examples of the pentavalent metal element include Nb, Ta, V, Sb, Bi, and the like.

In one aspect, the metal element (A element) selected from the group consisting of monovalent metal elements and divalent metal elements includes one or more kinds of metal elements selected from the group consisting of Li, Mn, Co, Ni, and Zn. The ε-iron oxide type ferromagnetic powder may contain, as A element, only one kind of metal element or two or more kinds of metal elements selected from the group consisting of monovalent metal elements and divalent metal elements. In a case where the ε-iron oxide type ferromagnetic powder contains two or more kinds of A elements, the content rate of A elements refers to the total content rate of two or more kinds of A elements. The same will be applied to the content rate of other metal elements such as B element and C element.

In one aspect, the pentavalent metal element (B element) includes one or more kinds of metal elements selected from the group consisting of V, Nb, Ta, Sb, and Bi.

In one aspect, the ε-iron oxide type ferromagnetic powder further contains a trivalent metal element (hereinafter, referred to as "C element"). Examples of the trivalent metal element include Al, Ga, In, Sc, Y, La, Ce, Pr, Nd, Pm, Sm, Eu, Gd, Tb, Dy, Ho, Er, Tm, Yb, Lu, Tl, and the like.

In one aspect, a content rate of the trivalent metal element (C element) in the ε-iron oxide type ferromagnetic powder is within a range of 0.1 to 16.0 at % with respect to 100.0 at % of Fe.

In one aspect, the trivalent metal element (C element) includes one or more kinds of metal elements selected from the group consisting of Al, Ga, and In.

In one aspect, a coercive force Hc of the ε-iron oxide type ferromagnetic powder is equal to or higher than 39 kA/m and equal to or lower than 400 kA/m.

In one aspect, a transition temperature Tc of the ε-iron oxide type ferromagnetic powder is equal to or higher than 450 K.

In one aspect, the ε-iron oxide type ferromagnetic powder is a ferromagnetic powder for magnetic recording.

In one aspect, the ε-iron oxide type ferromagnetic powder is a ferromagnetic powder for absorbing radio waves.

According to an aspect of the present invention, it is possible to provide an ε-iron oxide type ferromagnetic powder which has coercive force suitable for being applied in various uses and has excellent heat resistance.

DESCRIPTION OF THE PREFERRED EMBODIMENTS

Figure 1:
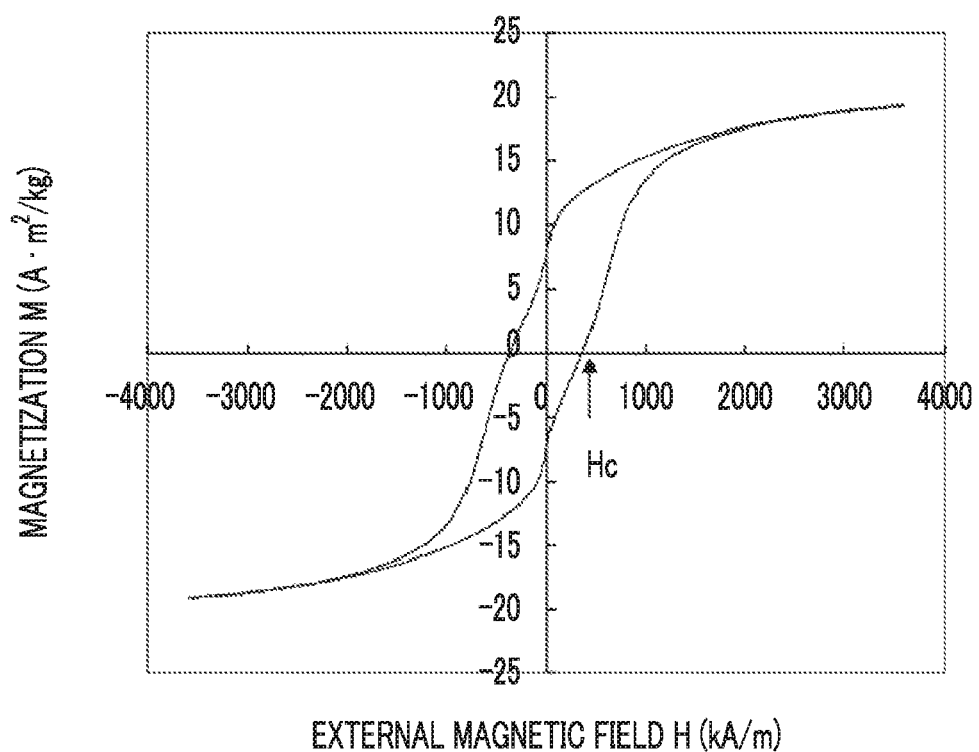
FIG. 1 shows a hysteresis curve obtained regarding an ε-iron oxide type ferromagnetic powder of Example 3 for measuring a coercive force Hc.

An aspect of the present invention relates to an ε-iron oxide type ferromagnetic powder containing Fe, a metal element (A element) selected from the group consisting of monovalent metal elements and divalent metal elements at a content rate within a range of 0.2 to 16.5 at % with respect to 100.0 at % of Fe, and a pentavalent metal element (B element) at a content rate within a range of 0.2 to 7.5 at % with respect to 100.0 at % of Fe, in which a total content rate of metal elements other than Fe is within a range of 2.5 to 24.0 at % with respect to 100.0 at % of Fe.

Pure ε-iron oxide is represented by a compositional formula of $Fe_2O_3$ and is composed of elements iron (Fe) and oxygen (O). In contrast, the aforementioned ε-iron oxide type ferromagnetic powder contains, as metal elements other than Fe, A element and B element at the aforementioned content rates respectively, and the total content rate of metal elements other than Fe is within the aforementioned range. Accordingly, the ε-iron oxide type ferromagnetic powder can have coercive force suitable for being applied in various uses and have excellent heat resistance.

Hereinafter, the ε-iron oxide type ferromagnetic powder will be more specifically described. In the following description, unless otherwise specified, the content rate of various elements is a content rate with respect to 100.0 at % of Fe.

Metal Elements Contained in Aforementioned ε-Iron Oxide Type Ferromagnetic Powder The aforementioned ε-iron oxide type ferromagnetic powder contains Fe and oxygen (O) as compositional elements essential for the powder to be an ε-iron oxide type ferromagnetic powder. The ε-iron oxide type ferromagnetic powder further contains A element and B element.

A Element

The content rate of A element is within a range of 0.2 to 16.5 at %. The inventors of the present invention consider that in a case where the content rate of A element is equal to or higher than 0.2 at %, A element makes a contribution to enable the ε-iron oxide type ferromagnetic powder to have coercive force suitable for various uses, and in a case where the content rate of A element is equal to or lower than 16.5 at %, A element makes a contribution to enable the ε-iron oxide type ferromagnetic powder to have excellent heat resistance. From the viewpoint of coercive force, the content rate of A element is preferably equal to or higher than 1.0 at %, and more preferably equal to or higher than 1.5 at %. From the viewpoint of heat resistance, the content rate of A element is preferably equal to or lower than 12.5 at %, and more preferably equal to or lower than 9.5 at %.

The content rate of various elements contained in the ε-iron oxide type ferromagnetic powder can be determined by known elementary analysis methods. For example, by analyzing a solution, which is obtained by dissolving the ε-iron oxide type ferromagnetic powder, in an inductively coupled plasma (ICP) analyzer, the content rate of various elements contained in the ε-iron oxide type ferromagnetic powder can be determined. Examples of the dissolving method of the ε-iron oxide type ferromagnetic powder include the dissolving method in examples which will be described later. However, the present invention is not limited to the dissolving method in examples which will be described later, and various methods that enable the dissolution of the ε-iron oxide type ferromagnetic powder can be used. Furthermore, depending on the analyzer used for elementary analysis, the ε-iron oxide type ferromagnetic powder can be analyzed in a powder state without being dissolved.

A element is a metal element selected from the group consisting of monovalent metal elements and divalent metal elements. Examples of A element include various metal elements described above. Among these, one or more kinds of metal elements selected from the group consisting of Li, Mn, Co, Ni, and Zn are preferable.

B Element

The content rate of B element in the ε-iron oxide type ferromagnetic powder is within a range of 0.2 to 7.5 at %. The inventors of the present invention consider that in a case where the content rate of B element is equal to or higher than 0.2 at %, B element makes a contribution to enable the ε-iron oxide type ferromagnetic powder to have coercive force suitable for various uses and have excellent heat resistance, and in a case where the content rate of B element is equal to or lower than 7.5 at %, B element makes a contribution to enable the ε-iron oxide type ferromagnetic powder to have excellent heat resistance. From the viewpoint of coercive force and heat resistance, the content rate of B element is preferably equal to or higher than 0.3 at %, and more preferably equal to or higher than 0.5 at %. From the viewpoint of heat resistance, the content rate of B element is preferably equal to or lower than 7.0 at %, more preferably equal to or lower than 5.5 at %, and even more preferably equal to or lower than 4.5 at %.

B element is a pentavalent metal element. Examples of B element include various metal elements described above. Among these, one or more kinds of metal elements selected from the group consisting of V, Nb, Ta, Sb, and Bi are preferable, and one or more kinds of metal elements selected from the group consisting of Nb and Ta are more preferable.

As described above, pure ε-iron oxide is represented by a compositional formula of $Fe_2O_3$ and is composed of Fe and O. In contrast, some or all of A element and B element contained in the aforementioned ε-iron oxide type ferromagnetic powder can substitute the site of Fe in the ε-iron oxide type crystal structure. Furthermore, some or all of metal elements that can be optionally contained in the powder, such as C element and the like which will be described later, can substitute the site of Fe in the ε-iron oxide type crystal structure. In a case where an ε-iron oxide type crystal structure is detected as a main phase from a ferromagnetic powder by X-ray diffractometry, and elements other than Fe and O are detected from the ferromagnetic powder through analysis performed by a known elementary analysis method, generally, it is possible to make a conclusion that the site of Fe in the ε-iron oxide type crystal structure is partially substituted with some or all of the aforementioned elements. Furthermore, for example, in an aspect, in a case where a lattice constant of the ε-iron oxide type crystal structure determined by X-ray diffractometry is different from a lattice constant of pure ε-iron oxide (ε-$Fe_2O_3$), it is possible to confirm that the site of Fe is substituted with elements other than Fe and O.

Metal Element that can be Optionally Contained

The aforementioned ε-iron oxide type ferromagnetic powder contains, as metal elements other than Fe, A element and B element at the content rate within the range described above. The ε-iron oxide type ferromagnetic powder may contain, as metal elements other than Fe, only A element and B element or one or more kinds of metal elements other than A element and B element. From the viewpoint of ease of adjusting the coercive force of the ε-iron oxide type ferromagnetic powder, as metal elements other than A element and B element, a trivalent element (C element) is preferable. Examples of the trivalent element include various metal elements described above. Among these, one or more kinds of metal elements selected from the group consisting of Al, Ga, and In are preferable, and Ga is more preferable.

From the viewpoint of ease of adjusting the coercive force, a content rate of C element in the ε-iron oxide type ferromagnetic powder is preferably equal to or higher than 0.1 at %, more preferably equal to or higher than 0.5 at %, and even more preferably equal to or higher than 2.5 at %. Furthermore, from the viewpoint of heat resistance, the content rate of C element in the ε-iron oxide type ferromagnetic powder is preferably equal to or lower than 16.0 at %, more preferably equal to or lower than 13.0 at %, and even more preferably equal to or lower than 11.0 at %.

Total Content Rate of Metal Elements Other than Fe

The total content rate of metal elements other than Fe in the ε-iron oxide type ferromagnetic powder is within a range of 2.5 to 24.0 at %. The inventors of the present invention consider that in a case where the total content rate of metal elements other than Fe is equal to or higher than 2.5 at %, the metal elements make a contribution to enable the ε-iron oxide type ferromagnetic powder to have coercive force suitable for various uses, and in a case where the total content rate is equal to or lower than 24.0 at %, the metal elements make a contribution to enable the ε-iron oxide type ferromagnetic powder to have excellent heat resistance. From the viewpoint of coercive force, the total content rate of metal elements other than Fe in the ε-iron oxide type ferromagnetic powder is preferably equal to or higher than 5.5 at %, and more preferably equal to or higher than 7.5 at %. From the viewpoint of heat resistance, the total content rate of metal elements other than Fe in the ε-iron oxide type ferromagnetic powder is preferably equal to or lower than 23.5 at %, more preferably equal to or lower than 17.5 at %, and even more preferably equal to or lower than 14.5 at %.

The metal elements other than Fe contained in the ε-iron oxide type ferromagnetic powder are at least A element and B element, and preferably A element, B element, and C element. Furthermore, the ε-iron oxide type ferromagnetic powder may or may not contain, as metal elements other than Fe, metal elements other than A element, B element, and C element.

Various Physical Properties

Coercive Force Hc

The ferromagnetic powder according to an aspect of the present invention can have a coercive force Hc suitable for being applied in various uses. The coercive force suitable for being applied in various uses is preferably a coercive force lower than the coercive force of pure ε-iron oxide, and is preferably equal to or lower than 400 kA/m, more preferably equal to or lower than 380 kA/m, and even more preferably equal to or lower than 360 kA/m. Furthermore, the coercive force suitable for being applied in various uses is equal to or higher than 39 kA/m, 150 kA/m, or 200 kA/m, for example.

The coercive force Hc can be measured using a known vibrating sample fluxmeter. In the present invention and the present specification, the coercive force Hc is a value measured at a measurement temperature of 25° C.±1° C. The measurement temperature is the atmospheric temperature of the periphery of the ferromagnetic powder at the time of measuring the coercive force.

Transition Temperature Tc

Examples of parameters of the heat resistance of the ferromagnetic powder include a transition temperature Tc. The transition temperature Tc is generally called Curie point, Curie temperature, or the like. In a case where a ferromagnetic powder has a high transition temperature Tc, the ferromagnetic powder can be regarded as having excellent heat resistance. The ε-iron oxide type ferromagnetic powder according to an aspect of the present invention can have excellent heat resistance. The transition temperature Tc of the ε-iron oxide type ferromagnetic powder is preferably equal to or higher than 450 K, more preferably equal to or higher than 457 K, and even more preferably equal to or higher than 465 K. Furthermore, the transition temperature Tc can be equal to or lower than 485 K, for example. Here, from the viewpoint of heat resistance, the higher the transition temperature, the better. Therefore, the transition temperature may be higher than the upper limit exemplified above.

Manufacturing Method

The aforementioned ε-iron oxide type ferromagnetic powder may contain various metal elements at the content rate and the total content rate described above, and the manufacturing method of the powder is not limited. The ε-iron oxide type ferromagnetic powder can be manufactured by the methods known as manufacturing methods of an ε-iron oxide type ferromagnetic powder. Regarding the manufacturing methods, for example, it is possible to refer to known techniques described in paragraphs "0017" to "0027" and examples in JP2008-174405A, paragraphs "0025" to "0054" and examples in WO2016/047559A1, paragraphs "0037" to "0045" and examples in WO2008/149785A1, and the like. For example, the ε-iron oxide type ferromagnetic powder can be obtained by a manufacturing method in which an ε-iron oxide type ferromagnetic powder is obtained through steps of preparing a precursor of an iron oxide-type ferromagnetic material (hereinafter, described as "precursor preparation step" as well), subjecting the precursor of an ε-iron oxide type ferromagnetic material to a coat-forming treatment (hereinafter, described as "coat-forming step" as well), converting the precursor into an ε-iron oxide type ferromagnetic material by performing a heat treatment on the precursor having undergone the coat-forming treatment (hereinafter, described as "heat treatment step" as well), subjecting the ε-iron oxide type ferromagnetic material to a coat-removing treatment (hereinafter, described as "coat-removing step" as well). The manufacturing method will be further described below. Here, the manufacturing method described below is a merely an example, and the ε-iron oxide type ferromagnetic powder according to an aspect of the present invention is not limited to ε-iron oxide type ferromagnetic powder manufactured by the manufacturing method exemplified below.

Precursor Preparation Step

The precursor of an ε-iron oxide type ferromagnetic material refers to a substance which contains an ε-iron oxide type crystal structure as a main phase by heating. The precursor can be a hydroxide, an oxyhydroxide (oxidized hydroxide), and the like containing iron and the metal elements described above, for example. The method for preparing the precursor is known, and a precursor preparation step in the aforementioned manufacturing method can be performed by a known method. For example, the precursor preparation step can be performed using a coprecipitation method, a reverse micelle method, and the like. For example, regarding the method for preparing the precursor, it is possible to refer to known techniques described in paragraphs "0017" to "0021" and examples in JP2008-174405A, paragraphs "0025" to "0046" and examples in WO2016/047559A1, paragraphs "0038" to "0040", "0042", "0044", and "0045" and examples in WO2008/149785A1, and the like. As described above, the ε-iron oxide type ferromagnetic powder according to an aspect of the present invention contains metal elements other than Fe. The ε-iron oxide type ferromagnetic powder may be obtained by substituting a portion of the compound that becomes a supply source of Fe in ε-iron oxide with the compound of the aforementioned metal element in the precursor preparation step. By the amount of the compound substituted, the composition of the obtained ε-iron oxide type ferromagnetic powder (the content rate and the total content rate of various metal elements) can be controlled. Examples of compounds that become supply sources of Fe and various metal elements include an inorganic salt (which may be a hydrate) such as nitrate, sulfate, or chloride, an organic salt (which may be a hydrate) such as a pentakis salt (hydrogen oxalate), a hydroxide, an oxyhydroxide, and the like.

Coat-Forming Step

In a case where the precursor is heated after the coat-forming treatment, a reaction can proceeds by which the precursor is converted into an ε-iron oxide type ferromagnetic material under the coat. It is considered that the coat can play a role of preventing the occurrence of sintering at the time of heating. From the viewpoint of ease of forming the coat, the coat-forming treatment is preferably performed in a solution, and more preferably performed by adding a coat-forming agent (compound for forming a coat) to a solution including the precursor. For example, in a case where the coat-forming treatment is performed in the same solution after the preparation of the precursor, by adding the coat-forming agent to the solution after the preparation of the precursor and stirring the solution, a coat can be formed on the precursor. As the coat, for example, a silicon-containing coat is preferable because the coat is easily formed on the precursor in a solution. Examples of the coat-forming agent for forming the silicon-containing coat include a silane compound such as alkoxysilane. Through the hydrolysis of a silane compound, a silicon-containing coat can be formed on the precursor preferably by using a sol-gel method. Specific examples of the silane compound include tetraethoxysilane (TEOS; tetraethyl orthosilicate), tetramethoxysilane, and various silane coupling agents. Regarding the coat-forming treatment, for example, it is possible to refer to the known techniques in paragraph "0022" and examples in JP2008-174405A, paragraphs "0047" to "0049" and examples in WO2016/047559A1, paragraphs "0041" and "0043" and examples in WO2008/149785A1, and the like. The coat may fully cover the surface of the precursor. Alternatively, a portion of the surface of the precursor may not be covered with the coat.

Heat Treatment Step

By performing a heat treatment on the precursor having undergone the coat-forming treatment, the precursor can be converted into an ε-iron oxide type ferromagnetic material. The heat treatment can be performed, for example, on the powder (powder of the precursor having the coat) collected from the solution in which the coat-forming treatment is performed. Regarding the heat treatment step, for example, it is possible to refer to the known techniques in paragraph "0023" and examples in JP2008-174405A, paragraph "0050" and examples in WO2016/047559A1, paragraphs "0041" and "0043" and examples in WO2008/149785A1, and the like.

Coat-Removing Step

By performing the heat treatment step, the precursor having the coat is converted into an ε-iron oxide type ferromagnetic material. Because the coat remains on the ε-iron oxide type ferromagnetic material obtained as above, it is preferable to perform a coat-removing treatment. Regarding the coat-removing treatment, for example, it is possible to refer to the known techniques described in paragraph "0025" and examples in JP2008-174405A, paragraph "0053" and examples in WO2008/149785A1, and the like. Here, the ε-iron oxide type ferromagnetic powder according to an aspect of the present invention may be manufactured without being subjected to the coat-removing treatment, that is, the ε-iron oxide type ferromagnetic powder may have a coat. In addition, in the coat-removing treatment, a portion of the coat may remain without being completely removed.

Before and/or after each of the steps described above, a known step can also be optionally performed. Examples of such a step include various known steps such as washing and drying.

Various Uses

The ε-iron oxide type ferromagnetic powder according to an aspect of the present invention described above can have coercive force suitable for being applied in various uses and have excellent heat resistance. Accordingly, the ε-iron oxide type ferromagnetic powder can be applied in various uses in various fields. For example, in the field of magnetic recording, in a case where a ferromagnetic powder contained in a magnetic layer of a recording medium (magnetic recording medium) for recording information has high coercive force, it is difficult to write (record) information. This is because in a case where the ferromagnetic powder contained in the magnetic layer has high coercive force, as a magnetic head used for writing information, a magnetic head having high saturated magnetic flux density should be used so as to write information by causing a strong magnetic field. Furthermore, the magnetic recording medium, in which the ferromagnetic powder contained in the magnetic layer has low heat resistance, poorly retains the recorded information. Therefore, while the magnetic recording medium is being used or stored, in some cases, a phenomenon occurs in which some or all of the information recorded on the magnetic recording medium is lost. In contrast, in a case where the aforementioned ε-iron oxide type ferromagnetic powder is used in a magnetic layer, it is possible to provide a magnetic recording medium which is suited for information recording and excellently retains the recorded information. Accordingly, in an aspect, the ε-iron oxide type ferromagnetic powder can be a ferromagnetic powder for magnetic recording. In addition, the ferromagnetic powder according to an aspect of the present invention can be used not only in the field of magnetic recording but also for a variety of uses in which an ε-iron oxide type ferromagnetic powder can be used. For example, the ε-iron oxide type ferromagnetic powder can be used for absorbing radio waves. Consequently, the ε-iron oxide type ferromagnetic powder according to an aspect of the present invention can also be used as a radio wave absorber (ferromagnetic powder for absorbing radio waves). In a case where the ε-iron oxide type ferromagnetic powder is used for absorbing radio waves, it is preferable that the powder has coercive force lower than that of pure ε-iron oxide and has excellent heat resistance. In the present invention and the present specification, radio waves refer to electromagnetic waves having a frequency of equal to or lower than 3,000 GHz. The ε-iron oxide type ferromagnetic powder according to an aspect of the present invention can also be used for a variety of uses in which an ε-iron oxide type ferromagnetic powder can be used, such as various electronic materials, magnet materials, biomolecule labeling agents, and drug carriers.

The aforementioned ε-iron oxide type ferromagnetic powder can be used for a variety of uses, in the form of a coating film of a composition (coating solution) prepared by mixing the powder with a binder and optionally with a solvent and various additives, for example. Alternatively, the ε-iron oxide type ferromagnetic powder can be used for a variety of uses in the form of a powder or in the form of a liquid such as a solution. As the binder, one or more kinds of resins are used. The resins include various synthetic or natural polymers. The polymers may be homopolymers or copolymers. The resins also include synthetic or natural rubber. As the binder used together with the ε-iron oxide type ferromagnetic powder, it is possible to use various known binders used for a variety of uses. The same shall be applied to the solvent and various additives.

EXAMPLES

Hereinafter, the present invention will be more specifically described using examples, but the present invention is not limited to the aspects shown in the examples. Unless otherwise specified, the operation described below is performed in the atmosphere at room temperature. The room temperature is 25° C.

Example 1

Procedure 1
Preparation of Solution A
A flask made of Teflon (registered trademark) was filled with 24.3 mL of pure water, and 2.85 mmol of iron(III) nitrate nonahydrate (supply source of Fe), 0.1 mmol of cobalt(II) nitrate hexahydrate (supply source of A element), and 0.05 mmol of niobium(V) hydrogen oxalate heptadecahydrate (supply source of B element) were added thereto. After the addition was finished, the elements were stirred and dissolved, thereby obtaining a solution A.

Preparation of Solution B
2.0 mL of aqueous ammonia with a concentration of 25% by mass was added to 22.3 mL of pure water, and the mixture was stirred, thereby obtaining a solution B.

Procedure 2
The solution B was added dropwise to the solution A. After the dropwise addition was finished, the obtained mixed solution was continuously stirred for 30 minutes.

Procedure 3
While the mixed solution obtained in Procedure 2 was being stirred, 0.49 mL of tetraethoxysilane was added thereto. After the addition, the mixed solution was continuously stirred for about 1 day.

Procedure 4
The mixed solution obtained in Procedure 3 was filtered, and the precipitate was collected and washed with pure water.

Procedure 5
The precipitate obtained in Procedure 4 was dried and then subjected to a heat treatment for 4 hours in a furnace (internal atmospheric temperature of the furnace: 1,050° C.) in the atmosphere, thereby obtaining a heat-treated powder.

Procedure 6
The heat-treated powder obtained in Procedure 5 was put into an aqueous NaOH solution with a concentration of 2 mol/L, the solution was stirred for 24 hours, and a treatment for removing silica (coat) on the particle surface of the heat-treated powder was performed. After the silica (coat)-removing treatment, the powder was filtered, washed with water, and dried, thereby obtaining a ferromagnetic powder.

Examples 2 to 35 and Comparative Examples 1 to 11

Ferromagnetic powders of Examples 2 to 33 and Comparative Examples 1 to 11 were obtained by the same method as in Example 1, except that either or both of the type of the supply sources of various elements used in Procedure 1 and the amount (referred to as a feed amount as well) of the supply sources used were changed as shown in Table 1.

The following supply sources were used as the supply sources of various elements.

Supply source of Fe: $Fe(NO_3)_3 \cdot 9H_2O$ (iron(III) nitrate nonahydrate)
Supply source of Co: $Co(NO_3)_2 \cdot 6H_2O$ (cobalt(II) nitrate hexahydrate)
Supply source of Mn: $Mn(NO_3)_2 \cdot 6H_2O$ (manganese(II) nitrate hexahydrate)
Supply source of Li: LiOH (lithium hydroxide)
Supply source of Zn: $Zn(NO_3)_2 \cdot 6H_2O$ (zinc (II) nitrate hexahydrate)
Supply source of Ni: $Ni(NO_3)_2 \cdot 6H_2O$ (nickel (II) 6 hexahydrate)
Supply source of Nb: $Nb(HC_2O_4)_5 \cdot 17H_2O$ (pentakis(hydrogen oxalate) niobium(V) heptadeca-hydrate)
Supply source of Ta: $K_8Ta6O_{19} \cdot 21H_2O$ (potassium hexatantalate heneicosa-hydrate)
Supply source of Ga: $Ga(NO_3)_3 \cdot 8H_2O$ (gallium(III) nitrate octahydrate)
Supply source of Ti: $Ti(SO_4)_2$ (30% by mass aqueous titanium sulfate solution)

Table 1 shows the amount (feed amount) of the supply sources of various elements used in Procedure 1 in Examples 1 to 35 and Comparative Examples 1 to 11. Table 2 shows the ratio of various metal elements to 100.0 at % of Fe calculated from the feed amount.

TABLE 1

| | Feed amount (mmol) | | | | | | | | | |
|---|---|---|---|---|---|---|---|---|---|---|
| | Supply source of A element (monovalent/divalent) | | | | | Supply source of B element (pentavalent) | | Supply source of C element (trivalent) | Supply source of tetravalent metal element | |
| | Supply source of Co | Supply source of Mn | Supply source of Li | Supply source of Zn | Supply source of Ni | Supply source of Nb | Supply source of Ta | Supply source of Ga | Supply source of Ti | Supply source of Fe |
| Ex. 1 | 0.1 | | | | | 0.05 | | | | 2.85 |
| Ex. 2 | 0.1 | | | | | 0.17 | | | | 2.85 |
| Ex. 3 | 0.1 | | | | | 0.05 | | 0.16 | | 2.85 |
| Ex. 4 | 0.1 | | | | | 0.17 | | 0.01 | | 2.85 |
| Ex. 5 | 0.1 | | | | | 0.17 | | 0.06 | | 2.85 |
| Ex. 6 | 0.1 | | | | | 0.17 | | 0.11 | | 2.85 |
| Ex. 7 | 0.1 | | | | | 0.17 | | 0.16 | | 2.85 |
| Ex. 8 | | 0.1 | | | | 0.17 | | 0.16 | | 2.85 |
| Ex. 9 | 0.1 | | | | | | 0.2 | 0.16 | | 2.85 |
| Ex. 10 | | | 0.05 | | | 0.17 | | 0.16 | | 2.85 |
| Ex. 11 | 0.1 | | | | | 0.17 | | 0.21 | | 2.85 |
| Ex. 12 | 0.1 | | | | | 0.17 | | 0.34 | | 2.85 |
| Ex. 13 | 0.06 | | | | | 0.02 | | 0.19 | | 2.85 |
| Ex. 14 | 0.06 | | | | | 0.06 | | 0.19 | | 2.85 |
| Ex. 15 | 0.06 | | | | | 0.11 | | 0.16 | | 2.85 |
| Ex. 16 | 0.06 | | | | | 0.11 | | 0.3 | | 2.85 |
| Ex. 17 | 0.06 | | | | | 0.11 | | 0.38 | | 2.85 |
| Ex. 18 | 0.01 | | | | | 0.11 | | 0.19 | | 2.85 |
| Ex. 19 | 0.03 | | | | | 0.11 | | 0.19 | | 2.85 |
| Ex. 20 | 0.05 | | | | | 0.09 | | 0.1 | | 2.85 |
| Ex. 21 | 0.05 | | | | | 0.09 | | 0.13 | | 2.85 |
| Ex. 22 | 0.05 | | | | | 0.09 | | 0.34 | | 2.85 |
| Ex. 23 | 0.05 | | | | | 0.09 | | 0.43 | | 2.85 |
| Ex. 24 | 0.1 | | | | | 0.18 | | 0.39 | | 2.85 |
| Ex. 25 | 0.15 | | | | | 0.28 | | 0.1 | | 2.85 |
| Ex. 26 | 0.15 | | | | | 0.28 | | 0.2 | | 2.85 |
| Ex. 27 | 0.2 | | | | | 0.35 | | 0.1 | | 2.85 |
| Ex. 28 | 0.2 | | | | | 0.35 | | 0.21 | | 2.85 |
| Ex. 29 | 0.33 | | | | | 0.35 | | 0.1 | | 2.85 |
| Ex. 30 | 0.37 | | | | | 0.35 | | 0.1 | | 2.85 |
| Ex. 31 | 0.43 | | | | | 0.35 | | 0.1 | | 2.85 |
| Ex. 32 | 0.25 | | | | | 0.5 | | 0.1 | | 2.85 |
| Ex. 33 | 0.33 | | | | | 0.6 | | 0.1 | | 2.85 |
| Ex. 34 | | | | 0.05 | | 0.17 | | 0.16 | | 2.85 |
| Ex. 35 | | | | | 0.05 | 0.17 | | 0.16 | | 2.85 |
| Comp. Ex. 1 | 0.25 | | | | | | | | 0.26 | 2.85 |
| Comp. Ex. 2 | 0.09 | | | | | | | 0.44 | 0.1 | 2.85 |
| Comp. Ex. 3 | 0.07 | | | | | | | | 0.07 | 2.85 |
| Comp. Ex. 4 | 0.12 | | | | | 0.21 | | 0.55 | | 2.85 |
| Comp. Ex. 5 | 0.34 | | | | | 0.6 | | 0.19 | | 2.85 |
| Comp. Ex. 6 | 0.02 | | | | | 0.04 | | | | 2.85 |
| Comp. Ex. 7 | 0.04 | | | | | 0.08 | | 0.006 | | 2.85 |
| Comp. Ex. 8 | 0.003 | | | | | 0.02 | | 0.07 | | 2.85 |
| Comp. Ex. 9 | 0.01 | | | | | 0.01 | | 0.07 | | 2.85 |
| Comp. Ex. 10 | 0.48 | | | | | 0.35 | | 0.1 | | 2.85 |
| Comp. Ex. 11 | 0.22 | | | | | 0.76 | | 0.09 | | 2.85 |

TABLE 2

| | Feed rate (at %, with respect to 100.0 at % of Fe) | | | | | | | | |
|---|---|---|---|---|---|---|---|---|---|
| | A element (monovalent/divalent) | | | | | B element (pentavalent) | | C element (trivalent) | Tetravalent metal element |
| | Co | Mn | Li | Zn | Ni | Nb | Ta | Ga | Ti |
| Ex. 1 | 3.5% | | | | | 1.8% | | | |
| Ex. 2 | 3.5% | | | | | 6.0% | | | |
| Ex. 3 | 3.5% | | | | | 1.8% | | 5.6% | |
| Ex. 4 | 3.5% | | | | | 6.0% | | 0.4% | |
| Ex. 5 | 3.5% | | | | | 6.0% | | 2.1% | |
| Ex. 6 | 3.5% | | | | | 6.0% | | 3.9% | |
| Ex. 7 | 3.5% | | | | | 6.0% | | 5.6% | |
| Ex. 8 | | 3.5% | | | | 6.0% | | 5.6% | |
| Ex. 9 | 3.5% | | | | | | 7.0% | 5.6% | |
| Ex. 10 | | | 1.8% | | | 6.0% | | 5.6% | |

TABLE 2-continued

| | Feed rate (at %, with respect to 100.0 at % of Fe) | | | | | | | | |
|---|---|---|---|---|---|---|---|---|---|
| | A element (monovalent/divalent) | | | | | B element (pentavalent) | | C element (trivalent) | Tetravalent metal element |
| | Co | Mn | Li | Zn | Ni | Nb | Ta | Ga | Ti |
| Ex. 11 | 3.5% | | | | | 6.0% | | 7.4% | |
| Ex. 12 | 3.5% | | | | | 6.0% | | 11.9% | |
| Ex. 13 | 2.1% | | | | | 0.7% | | 6.7% | |
| Ex. 14 | 2.1% | | | | | 2.1% | | 6.7% | |
| Ex. 15 | 2.1% | | | | | 3.9% | | 5.6% | |
| Ex. 16 | 2.1% | | | | | 3.9% | | 10.5% | |
| Ex. 17 | 2.1% | | | | | 3.9% | | 13.3% | |
| Ex. 18 | 0.4% | | | | | 3.9% | | 6.7% | |
| Ex. 19 | 1.1% | | | | | 3.9% | | 6.7% | |
| Ex. 20 | 1.8% | | | | | 3.2% | | 3.5% | |
| Ex. 21 | 1.8% | | | | | 3.2% | | 4.6% | |
| Ex. 22 | 1.8% | | | | | 3.2% | | 11.9% | |
| Ex. 23 | 1.8% | | | | | 3.2% | | 15.1% | |
| Ex. 24 | 3.5% | | | | | 6.3% | | 13.7% | |
| Ex. 25 | 5.3% | | | | | 9.8% | | 3.5% | |
| Ex. 26 | 5.3% | | | | | 9.8% | | 7.0% | |
| Ex. 27 | 7.0% | | | | | 12.3% | | 3.5% | |
| Ex. 28 | 7.0% | | | | | 12.3% | | 7.4% | |
| Ex. 29 | 11.6% | | | | | 12.3% | | 3.5% | |
| Ex. 30 | 13.0% | | | | | 12.3% | | 3.5% | |
| Ex. 31 | 15.1% | | | | | 12.3% | | 3.5% | |
| Ex. 32 | 8.8% | | | | | 17.5% | | 3.5% | |
| Ex. 33 | 11.6% | | | | | 21.1% | | 3.5% | |
| Ex. 34 | | | 1.8% | | | 6.0% | | 5.6% | |
| Ex. 35 | | | | | 1.8% | 6.0% | | 5.6% | |
| Comp. Ex. 1 | 8.8% | | | | | | | | 9.1% |
| Comp. Ex. 2 | 3.2% | | | | | | | 15.4% | 3.5% |
| Comp. Ex. 3 | 2.5% | | | | | | | | 2.5% |
| Comp. Ex. 4 | 4.2% | | | | | 7.4% | | 19.3% | |
| Comp. Ex. 5 | 11.9% | | | | | 21.1% | | 6.7% | |
| Comp. Ex. 6 | 0.7% | | | | | 1.4% | | | |
| Comp. Ex. 7 | 1.4% | | | | | 2.8% | | 0.2% | |
| Comp. Ex. 8 | 0.1% | | | | | 0.7% | | 2.5% | |
| Comp. Ex. 9 | 0.4% | | | | | 0.4% | | 2.5% | |
| Comp. Ex. 10 | 16.8% | | | | | 12.3% | | 3.5% | |
| Comp. Ex. 11 | 7.7% | | | | | 26.7% | | 3.2% | |

Evaluation Method (1) X-Ray Diffractometry

From the ferromagnetic powder obtained as above, a sample powder was collected and analyzed by X-ray diffractometry. As a result of the analysis, it was confirmed that the ferromagnetic powders of the examples and the comparative examples obtained by the aforementioned procedures were ε-iron oxide type ferromagnetic powders.

(2) Content Rates of Various Metal Elements

From each of the ε-iron oxide type ferromagnetic powders of the examples and the comparative examples, 12 mg of a sample powder was collected and put into a container containing 10 ml of 4 mol/L hydrochloric acid.

The container was kept on a hot plate with a set temperature of 80° C. for 3 hours, thereby obtaining a powder solution. As a result of visually observing the solution, no solid content was confirmed. Therefore, it was concluded that the powder completely dissolved.

The solution was filtered through a membrane filter having a pore size of 0.1 μm. The filtrate obtained in this way was subjected to elementary analysis by using an inductively coupled plasma (ICP)-Auger electron spectroscopy (AES) analyzer. From the obtained elementary composition, the content rate and the total content rate of various metal elements with respect to 100.0 at % of Fe were determined.

(3) Coercive Force Hc

The coercive force Hc of each of the ε-iron oxide type ferromagnetic powders of the examples and the comparative examples was measured using a vibrating sample fluxmeter (manufactured by TOEI INDUSTRY CO., LTD.) at a magnetic field intensity of 3,580 kA/m. From the obtained hysteresis curve (referred to as "M-H curve"), the coercive force Hc was determined.

For example, a hysteresis curve obtained regarding the ε-iron oxide type ferromagnetic powder of Example 3 is shown in FIG. 1.

(4) Transition Temperature Tc

By using a vibrating sample fluxmeter (manufactured by TOEI INDUSTRY CO., LTD.), a magnetic field was created at a magnetic field intensity of 1,190 kA/m, and then the magnetic field intensity was reduced to 0. The magnetization (remnant magnetization) obtained at this time was measured at temperatures of 223 K, 248 K, 273 K, 298 K, 323 K, 373 K, 423 K, and 473 K, and a curve showing the relationship between a remnant magnetization Mr and a temperature T was plotted. The temperature at which the remnant magnetization becomes 0 was taken as a temperature Tc.

Figure 2:
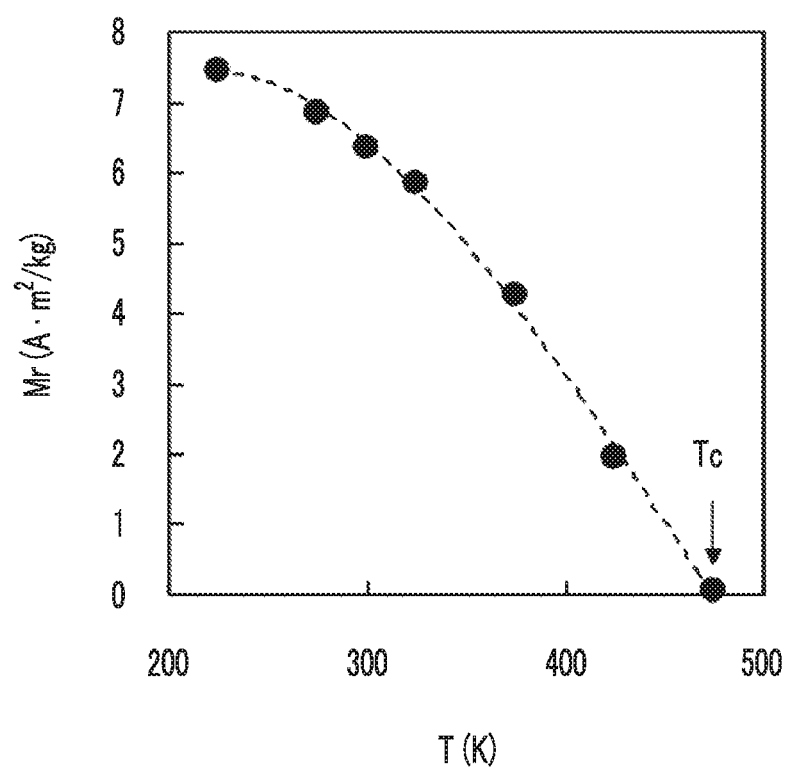
FIG. 2 is a curve showing the relationship between a remnant magnetization Mr and a temperature T that is obtained regarding the ε-iron oxide type ferromagnetic powder of Example 3 for measuring a transition temperature Tc.

For example, a curve showing the relationship between the remnant magnetization Mr and the temperature T obtained regarding the ε-iron oxide type ferromagnetic powder of Example 3 is shown in FIG. 2.

The results obtained as above are shown in Table 3.

TABLE 3

Content rates of various metal elements
(at %, with respect to 100.0 at % of Fe)

| | A element (monovalent/divalent) | | | | | B element (pentavalent) | | C element (trivalent) | Tetravalent metal element | Total content rate of metal elements other than Fe | Result of physical property evaluation | |
|---|---|---|---|---|---|---|---|---|---|---|---|---|
| | Co | Mn | Li | Zn | Ni | Nb | Ta | Ga | Ti | | Hc (kA/m) | Tc (K) |
| Ex. 1 | 3.5% | | | | | 0.5% | | | | 4.0% | 391 | 480 |
| Ex. 2 | 3.5% | | | | | 1.7% | | | | 5.2% | 359 | 478 |
| Ex. 3 | 3.7% | | | | | 0.5% | | 5.5% | | 9.7% | 343 | 473 |
| Ex. 4 | 3.5% | | | | | 1.7% | | 0.3% | | 5.5% | 355 | 477 |
| Ex. 5 | 3.5% | | | | | 1.7% | | 2.2% | | 7.4% | 330 | 475 |
| Ex. 6 | 3.7% | | | | | 1.7% | | 3.8% | | 9.2% | 300 | 473 |
| Ex. 7 | 3.7% | | | | | 1.7% | | 5.5% | | 10.9% | 247 | 470 |
| Ex. 8 | | 3.7% | | | | 1.7% | | 5.5% | | 10.9% | 279 | 465 |
| Ex. 9 | 3.7% | | | | | | 1.7% | 5.5% | | 10.9% | 255 | 463 |
| Ex. 10 | | | 1.8% | | | 1.8% | | 5.5% | | 9.1% | 303 | 465 |
| Ex. 11 | 3.8% | | | | | 1.7% | | 7.3% | | 12.8% | 220 | 466 |
| Ex. 12 | 3.9% | | | | | 1.9% | | 11.7% | | 17.5% | 203 | 455 |
| Ex. 13 | 2.2% | | | | | 0.2% | | 6.5% | | 8.9% | 390 | 477 |
| Ex. 14 | 2.2% | | | | | 0.6% | | 6.6% | | 9.4% | 365 | 476 |
| Ex. 15 | 2.2% | | | | | 1.1% | | 5.4% | | 8.7% | 360 | 475 |
| Ex. 16 | 2.3% | | | | | 1.1% | | 10.2% | | 13.6% | 315 | 462 |
| Ex. 17 | 2.3% | | | | | 1.1% | | 12.8% | | 16.2% | 293 | 458 |
| Ex. 18 | 0.5% | | | | | 1.1% | | 6.5% | | 8.1% | 389 | 478 |
| Ex. 19 | 1.1% | | | | | 1.1% | | 6.5% | | 8.7% | 363 | 477 |
| Ex. 20 | 1.6% | | | | | 0.9% | | 2.7% | | 5.2% | 387 | 480 |
| Ex. 21 | 1.7% | | | | | 0.9% | | 4.3% | | 6.9% | 365 | 477 |
| Ex. 22 | 1.7% | | | | | 0.9% | | 11.4% | | 14.0% | 305 | 460 |
| Ex. 23 | 1.8% | | | | | 0.9% | | 14.7% | | 17.4% | 279 | 451 |
| Ex. 24 | 4.0% | | | | | 1.8% | | 13.1% | | 18.9% | 239 | 453 |
| Ex. 25 | 5.6% | | | | | 2.8% | | 2.8% | | 11.2% | 265 | 469 |
| Ex. 26 | 5.8% | | | | | 2.9% | | 6.9% | | 15.6% | 222 | 462 |
| Ex. 27 | 6.8% | | | | | 3.4% | | 2.8% | | 13.0% | 239 | 465 |
| Ex. 28 | 7.1% | | | | | 3.5% | | 7.1% | | 17.7% | 210 | 460 |
| Ex. 29 | 11.6% | | | | | 3.5% | | 3.5% | | 18.6% | 190 | 458 |
| Ex. 30 | 12.9% | | | | | 3.5% | | 3.5% | | 19.9% | 182 | 455 |
| Ex. 31 | 15.1% | | | | | 3.5% | | 3.5% | | 22.1% | 170 | 452 |
| Ex. 32 | 8.8% | | | | | 5.3% | | 2.9% | | 17.0% | 239 | 462 |
| Ex. 33 | 12.1% | | | | | 6.1% | | 3.0% | | 21.2% | 160 | 453 |
| Ex. 34 | | | | 1.7% | | 1.8% | | 5.5% | | 9.0% | 322 | 467 |
| Ex. 35 | | | | | 1.8% | 1.8% | | 5.5% | | 9.1% | 315 | 470 |
| Comp. Ex. 1 | 8.8% | | | | | | | | 8.8% | 17.6% | 160 | 427 |
| Comp. Ex. 2 | 3.0% | | | | | | | 15.1% | 3.0% | 21.1% | 223 | 415 |
| Comp. Ex. 3 | 2.6% | | | | | | | | 2.6% | 5.2% | 638 | 460 |
| Comp. Ex. 4 | 4.2% | | | | | 2.1% | | 18.8% | | 25.1% | 160 | 420 |
| Comp. Ex. 5 | 12.1% | | | | | 6.1% | | 6.5% | | 24.7% | 140 | 445 |
| Comp. Ex. 6 | 0.8% | | | | | 0.4% | | | | 1.2% | 718 | 485 |
| Comp. Ex. 7 | 1.5% | | | | | 0.8% | | 0.2% | | 2.5% | 519 | 480 |
| Comp. Ex. 8 | 0.1% | | | | | 0.2% | | 2.3% | | 2.6% | 622 | 482 |
| Comp. Ex. 9 | 0.5% | | | | | 0.1% | | 2.3% | | 2.9% | 710 | 480 |
| Comp. Ex. 10 | 16.9% | | | | | 3.5% | | 3.5% | | 23.9% | 155 | 445 |
| Comp. Ex. 11 | 7.7% | | | | | 7.7% | | 3.0% | | 18.4% | 144 | 440 |

From the comparison between the examples and the comparative examples shown in Table 3, it is possible to confirm that the ε-iron oxide type ferromagnetic powders of the examples have both the coercive force suitable for being applied in various uses and the excellent heat resistance.

One aspect of the present invention is useful in various technical fields in which an ε-iron oxide type ferromagnetic powder can be used.

What is claimed is:

1. An ε-iron oxide type ferromagnetic powder comprising:
   Fe;
   a metal element selected from the group consisting of monovalent metal elements and divalent metal elements at a content rate within a range of 0.2 to 16.5 at % with respect to 100.0 at % of Fe; and
   a pentavalent metal element at a content rate within a range of 0.2 to 7.5 at % with respect to 100.0 at % of Fe,
   wherein a total content rate of metal elements other than Fe is within a range of 2.5 to 24.0 at % with respect to 100.0 at % of Fe.

2. The ε-iron oxide type ferromagnetic powder according to claim 1,
   wherein the metal element selected from the group consisting of monovalent metal elements and divalent metal elements includes one or more kinds of metal elements selected from the group consisting of Li, Mn, Co, Ni, and Zn.

3. The ε-iron oxide type ferromagnetic powder according to claim 1,
wherein the pentavalent metal element includes one or more kinds of metal elements selected from the group consisting of V, Nb, Ta, Sb, and Bi.

4. The ε-iron oxide type ferromagnetic powder according to claim 1, further comprising:
a trivalent metal element.

5. The ε-iron oxide type ferromagnetic powder according to claim 4,
wherein a content rate of the trivalent metal element is within a range of 0.1 to 16.0 at % with respect to 100.0 at % of Fe.

6. The ε-iron oxide type ferromagnetic powder according to claim 4,
wherein the trivalent metal element includes one or more kinds of metal elements selected from the group consisting of Al, Ga, and In.

7. The ε-iron oxide type ferromagnetic powder according to claim 2,
wherein the pentavalent metal element includes one or more kinds of metal elements selected from the group consisting of V, Nb, Ta, Sb, and Bi.

8. The ε-iron oxide type ferromagnetic powder according to claim 2, further comprising:
a trivalent metal element.

9. The ε-iron oxide type ferromagnetic powder according to claim 8,
wherein a content rate of the trivalent metal element is within a range of 0.1 to 16.0 at % with respect to 100.0 at % of Fe.

10. The ε-iron oxide type ferromagnetic powder according to claim 8,
wherein the trivalent metal element includes one or more kinds of metal elements selected from the group consisting of Al, Ga, and In.

11. The ε-iron oxide type ferromagnetic powder according to claim 1,
which has a coercive force Hc of equal to or higher than 39 kA/m and equal to or lower than 400 kA/m.

12. The ε-iron oxide type ferromagnetic powder according to claim 1,
which has a transition temperature Tc of equal to or higher than 450 K.

13. The ε-iron oxide type ferromagnetic powder according to claim 1,
wherein the metal element selected from the group consisting of monovalent metal elements and divalent metal elements includes one or more kinds of metal elements selected from the group consisting of Li, Mn, Co, Ni, and Zn,
the pentavalent metal element includes one or more kinds of metal elements selected from the group consisting of V, Nb, Ta, Sb, and Bi,
which further comprises a trivalent metal element wherein the trivalent metal element includes one or more kinds of metal elements selected from the group consisting of Al, Ga, and In, and a content rate of the trivalent metal element is within a range of 0.1 to 16.0 at % with respect to 100.0 at % of Fe,
which has a coercive force Hc of equal to or higher than 39 kA/m and equal to or lower than 400 kA/m, and has a coercive force Hc of equal to or higher than 39 kA/m and equal to or lower than 400 kA/m.

14. The ε-iron oxide type ferromagnetic powder according to claim 1,
which is a ferromagnetic powder for magnetic recording.

15. The ε-iron oxide type ferromagnetic powder according to claim 1,
which is a ferromagnetic powder for absorbing radio waves.

16. The ε-iron oxide type ferromagnetic powder according to claim 13,
which is a ferromagnetic powder for magnetic recording.

17. The ε-iron oxide type ferromagnetic powder according to claim 13,
which is a ferromagnetic powder for absorbing radio waves.

* * * * *